(12) United States Patent
Murphy et al.

(10) Patent No.: US 9,221,597 B2
(45) Date of Patent: Dec. 29, 2015

(54) INTERCONNECT MEMBRANE

(75) Inventors: Bryan Murphy, Park West (IE);
William Jon Rittgers, Ceilbridge (IE);
Odhran Hendley, Bray (IE); Eduardo Macias, Cionee Meath na (IE); Michael Mulloy, Co. Dublin (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/394,144

(22) PCT Filed: Jun. 12, 2012

(86) PCT No.: PCT/US2012/042054
§ 371 (c)(1),
(2), (4) Date: Oct. 13, 2014

(87) PCT Pub. No.: WO2013/187884
PCT Pub. Date: Dec. 19, 2013

(65) Prior Publication Data
US 2015/0053268 A1    Feb. 26, 2015

(51) Int. Cl.
*B41J 2/175*    (2006.01)
*B65D 83/62*   (2006.01)
*F16K 7/12*     (2006.01)

(52) U.S. Cl.
CPC ............ *B65D 83/62* (2013.01); *B41J 2/17523* (2013.01); *F16K 7/12* (2013.01); *Y10T 137/0318* (2015.04); *Y10T 137/8593* (2015.04)

(58) Field of Classification Search
None
See application file for complete search history.

(56) References Cited

U.S. PATENT DOCUMENTS

| | | |
|---|---|---|
| 5,121,132 A | 6/1992 | Pan et al. |
| 6,019,457 A | 2/2000 | Silverbrook et al. |
| 6,447,109 B1 | 9/2002 | Williamson et al. |
| 7,182,447 B2 | 2/2007 | Anderson et al. |
| 7,399,073 B2 | 7/2008 | Rittgers et al. |
| 7,540,599 B2 | 6/2009 | Droege et al. |
| 2002/0071012 A1 | 6/2002 | Breemes et al. |
| 2002/0075366 A1 | 6/2002 | Smith et al. |
| 2006/0216491 A1 | 9/2006 | Ward et al. |
| 2007/0040875 A1 | 2/2007 | Inoue |
| 2008/0239032 A1 | 10/2008 | Bartlett |
| 2010/0039484 A1 | 2/2010 | Silverbrook et al. |
| 2011/0025788 A1 | 2/2011 | Rittgers et al. |
| 2015/0035915 A1* | 2/2015 | Murphy et al. ............. 347/86 |

* cited by examiner

*Primary Examiner* — Geoffrey Mruk
*Assistant Examiner* — Bradley Thies
(74) *Attorney, Agent, or Firm* — HP Inc. Patent Department

(57) ABSTRACT

A liquid permeable interconnect membrane for a liquid supply outlet, and a void between the interconnect membranes and an opposite void wall, the interconnect membrane being stiff enough to avoid unwanted pore deformation or contact with the opposite void wall.

15 Claims, 5 Drawing Sheets

Section A-A

INTERCONNECT MEMBRANE

BACKGROUND

Liquid supplies can be used to supply liquid to a liquid dispense head of a liquid dispense device. In certain instances the supplies are arranged to be replaced when substantially depleted. Particular liquid supplies include a capillary medium for holding the liquid. The capillary medium provides for a backpressure in the supply and holds the liquid. For example, the liquid is withdrawn from the capillary medium by a capillary member of the liquid dispense device and that has a higher capillarity than the capillary medium. It can be difficult to determine when the liquid supply needs to be replaced, for example for replacing, recycling, refilling, etc.

BRIEF DESCRIPTION OF THE DRAWINGS

For the purpose of illustration, certain examples constructed in accordance with the teachings of this disclosure will now be described with reference to the accompanying drawings, in which.

DETAILED DESCRIPTION

In the following detailed description, reference is made to the accompanying drawings. The examples in the description and drawings should be considered illustrative and are not to be considered as limiting to the specific example or element described. Multiple examples may be derived from the following description and/or drawings through modification, combination or variation of certain elements. Furthermore, it may be understood that examples or elements that are not literally described may be derived from the description and drawings by a person of ordinary skill in the art.

Figure 1:
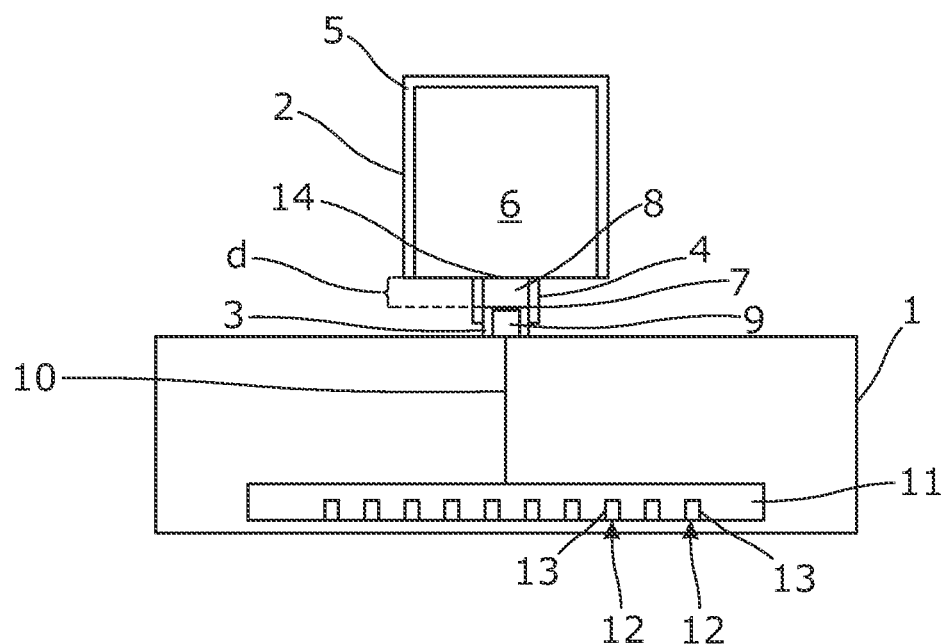
FIG. 1 illustrates a diagram of an example of a liquid supply fluidically connected to an example of a liquid dispense device.

FIG. 1 illustrates an example of a liquid dispense device 1 and a liquid supply 2. The liquid dispense device 1 includes an inlet 3 for receiving liquid. The liquid supply 2 includes an outlet 4 for connection to the inlet 3 and for providing the liquid to, in the shown example, the liquid dispense device 1, and in other examples, other host devices. In the illustrated connected state, the liquid dispense device 1 and the liquid supply 2 are fluidically connected through the inlet 3 and outlet 4.

The liquid supply 2 includes a reservoir 5 and a capillary medium 6 that is contained in the reservoir 5. The capillary medium 6 includes capillary channels, or capillaries, for holding the liquid. The capillary medium 6 provides for a backpressure to retain the liquid. For example, the capillary medium 6 includes fibers or sponge like features. For example, the outlet 4 includes a liquid permeable interconnect membrane 7 at a distance d from the capillary medium 6. A void 8 is provided between the capillary medium 6 and the interconnect membrane 7. For example, the void 8 is defined by a cylindrical inner wall in the outlet 4, the interconnect membrane 7 and a void wall 14 opposite to the membrane 7. In the illustrated example, the void wall 14 is formed by the capillary medium 6. In other examples, a separate second membrane or filter or the like may form the opposite void wall 14.

For example, the void 8 is defined by a space that is free of solid features to allow it to be completely filled with fluid. For example, the distance d corresponds to the height of the void 8. For example a minimum distance d is approximately 2 millimeter, although this can vary depending on the type of liquid that is used. For example, the fluid permeable interconnect membrane 7 includes at least one of a wick, cloth, gasket, woven or compressed fibers, polymers, cotton, and cellulose. Some examples of the interconnect membrane 7 have a thickness of less than approximately 3 millimeters, or less than approximately 2 millimeters, or less than approximately 1 millimeter.

In an example, the net 3 includes a capillary member 9 for withdrawing liquid from the capillary medium 6, through the void 8 and the interconnect membrane 7, and providing the liquid to a further liquid channel 10 and a liquid dispense head 11. The capillary member 9 includes capillaries. For example, the liquid channel 10 includes a manifold and/or a multitude of channels. The liquid dispense head 11 includes nozzles 12. For example, liquid dispense actuators 13 are provided in the dispense head 11, near the nozzles 12, for actuating the dispensing of the liquid. For example, the liquid dispense actuators include resistors such as thermal or piezo resistors for jetting liquid out of the nozzles 12. When an actuator 13 triggers, the liquid is dispensed out of the nozzles 12. During dispensing, the liquid is drawn from the capillary medium 6, through the void 8, interconnect membrane 7 and capillary member 9. For example, the liquid dispense device 1 includes an inkjet printer, plotter, or another type of liquid dispense device. For example the dispense head 11 includes a printhead.

For example, during connection the capillary member 9 engages the interconnect membrane 7. For example, the interconnect membrane 7 has a higher capillary pressure than the capillary medium 6. For example, the capillary member 9 has a higher capillary pressure than the interconnect membrane 7. In other non-illustrated examples other capillary features are provided, other than capillary medium 6, the interconnect membrane 7 and the capillary member 9. For example a downstream capillary feature 7, 9 has a higher average capillary pressure than an upstream capillary feature 6, 7. For example, cascading capillary pressures along the flow direction facilitate liquid flow. In a connected state, the interconnect membrane 7 and the capillary member 9 have a high enough capillary pressure to pull the liquid out of the capillary medium 5 through the void 8.

Figure 2:
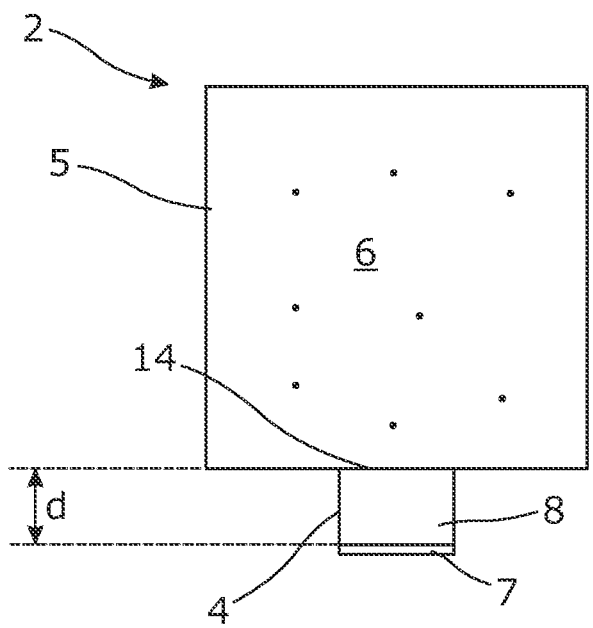
FIG. 2 illustrates a diagram of an example of a liquid supply.

FIG. 2 illustrates an example of the liquid supply 2 in a disconnected state. For example, the interconnect membrane 7 is relatively stiff, for example stiff enough to avoid contact with the opposite void wall 14 in a connected state of the liquid supply 2. For example, in a connected state, the interconnect membrane 7 is sufficiently stiff so as to control pore sizes and maintain desired capillary or bubble characteristics. In particular examples some flexing of the interconnect membrane 7 may occur, while maintaining a sufficient distance d and desired capillary or bubble characteristics. For example, an average capillarity of the interconnect membrane 7 is higher than an average capillarity of the capillary medium 6. For example, an average effective pore diameter of the interconnect membrane 7 is less than the average effective pore diameter of the capillary medium 6.

For example, the average capillarity of the interconnect membrane 7 provides for a certain bubble pressure that is enough to maintain menisci over its surface at printing and priming pressures of the liquid dispense device 1. For example, the capillarity of the interconnect membrane 7 is arranged to withstand a pressure differential between printing and priming pressures on one side and a backpressure of the capillary medium 6 on the other side. For example the backpressure in a functional supply 2 is between approximately 1 and approximately 10 inches water column. For example the interconnect membrane 7 is arranged so that its menisci form a seal that, to a certain extent, inhibits air flow into the reservoir 5 under said printing and priming pressures. In different examples of liquid dispense devices 1 and supplies 2 different dispensing and servicing pressures may apply. For example, the average capillary pressure and bubble pressure of the interconnect membrane 7 are between approximately 15 and approximately 25 inches water column. For example priming pressures near the interconnect membrane 7 are between approximately 10 and approximately 20 inches water column. For example printing pressures near the interconnect membrane 7 are between approximately 1 and approximately 10 inches water column. In an example, a depleted capillary medium 6 has a backpressure of approximately 10 inches water column, or for example somewhere between approximately 5 and 15 inches water column. For example, the interconnect membrane 7 in a wetted state has a bubble pressure of between approximately 15 and approximately 25 inches water column. For example, the capillary medium 6 in a wetted state has a capillary pressure of between approximately 1 and approximately 10 inches water column. For example, the bubble and capillary pressures can be determined by various factors including capillary length, effective diameter, contact angle, surface tension, etc. For example, in a dynamic state of liquid flow, viscosity also can be a factor.

For example, at or near depletion some of the capillaries may stop providing liquid through the void wall 14. For example, as more and more capillaries close to the void wall 14 surface stop providing fluid, at some point air bubbles pass through a meniscus formed on the interconnect membrane 7. When the meniscus breaks the capillary link between the capillary medium 6 and the capillary member 9 also breaks. For example, a portion of left over liquid in the void 8 withdraws back into the capillary medium 6 after the meniscus breaks.

For example, the breaking of the capillary link between the capillary medium 6 and the capillary member 9 cuts off the supply of liquid to the liquid dispense device 1, providing for a straight cut off effect of the liquid. Such cut off effect prevents dispensing uncontrolled liquid quantities near depletion. For example such cut off effect inhibits printing of faded images. For example, it allows relatively objective determination of when a liquid supply 2 needs to be replaced, refilled, recycled, etc. for example using sensors, automated signals, etc.

Figure 3:
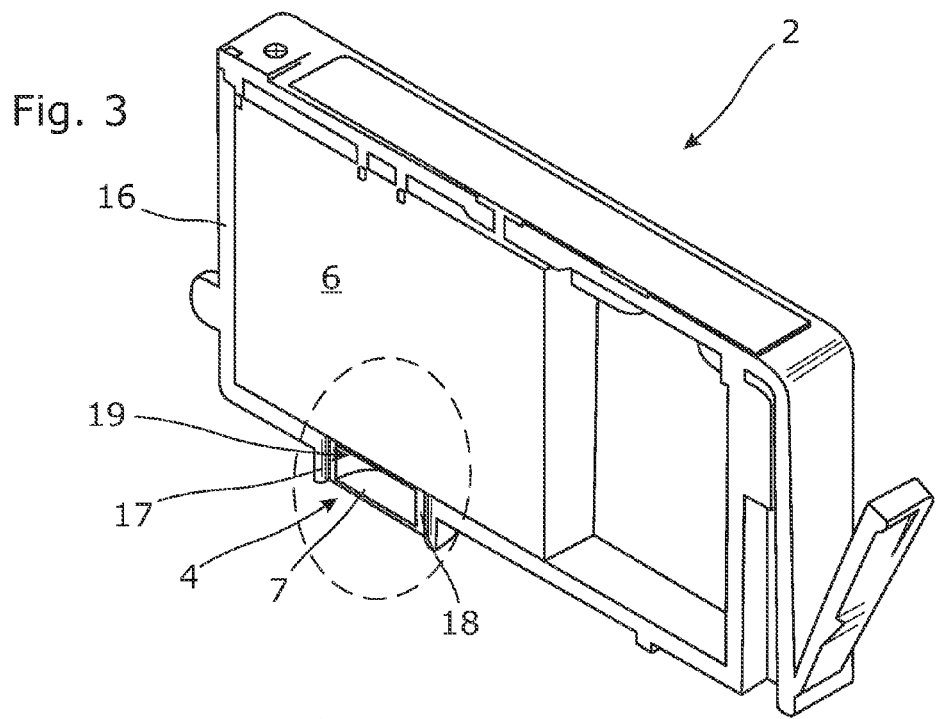
FIG. 3 illustrates an example of a liquid supply in perspective view.
Figure 4:
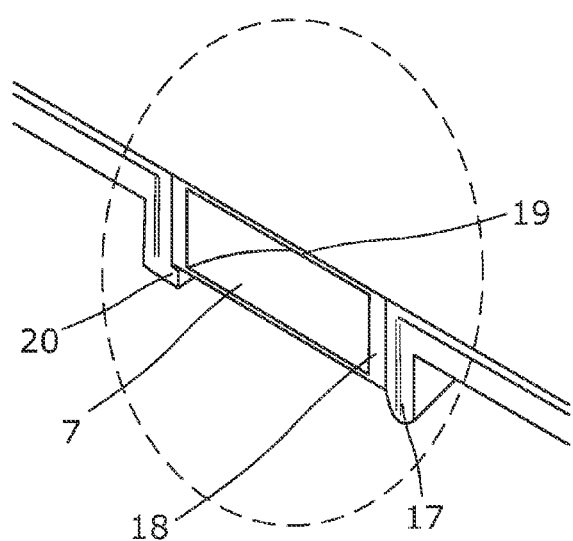
FIG. 4 illustrates a detail of the example of the liquid supply of FIG. 3 in perspective view.
Figure 5:
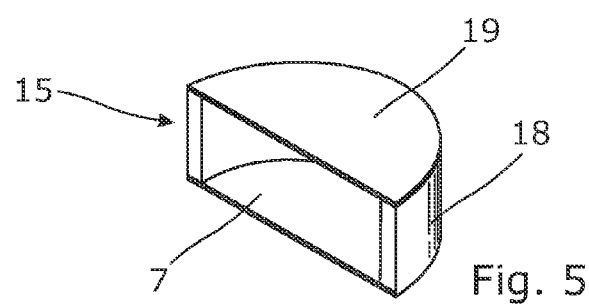
FIG. 5 illustrates an example of an interconnect cylinder as used in the example of the liquid supply of FIGS. 3 and 4, in perspective view.

FIG. 3 illustrates an example of a cross section of a liquid supply 2. FIG. 4 illustrates a more detailed cross sectional view on the outlet 4 of the supply 2 of FIG. 3. FIG. 5 illustrates a cross section of an interconnect cylinder 15 arranged to be fitted in the outlet 4 of the supply 2 of FIGS. 4 and 5. The example supply 2 of FIG. 3 includes an outer housing 16. The outlet 4 includes a rigid outer cylindrical wall 17 that is part of the outer housing 16. For example, the rigid outer cylindrical wall 17 is integrally molded with a portion of the rest of the housing 16. A separate, rigid inner cylinder 18 is arranged within the outer cylinder 17. The interconnect membrane 7 is connected to the inner cylinder 18. For example, the inner cylinder 18 and the interconnect membrane 7 form part of the interconnect cylinder 15, as shown in FIG. 5. For example, the supply 2 includes a second liquid permeable membrane 19, or top membrane, opposite to the interconnect membrane 7. For example, the second membrane 19 abuts the capillary medium 6. A capillary link is present between the capillary medium 6 and the second membrane 19. In the connected state of the supply 2 an extra force may be applied to press the second membrane 19 against the capillary medium 6. For example, the second membrane 19 defines the opposite void wall 14, on the opposite side of the void 8 with respect to the interconnect membrane 7. The second membrane 19 is connected to the inner cylinder 18. In an example, the second membrane 19 includes a hydrophilic surface or is substantially hydrophilic. In an example, the second membrane 19 has equal or similar capillary and bubble pressure as the interconnect membrane 7. In again another example the interconnect membrane 7 and the second membrane 19 are equal or similar.

For example, the inner cylinder 18 is arranged to move or slide with respect to the outer cylinder 17. For example, during connection the inner cylinder 18 and outer cylinder 17 move with respect to each other over at least approximately 0.5, 1, 2 or 3 or more millimeters, to push the second membrane 19 against the capillary medium 6 when it is fluidically connected to the inlet 3, enhancing the capillary link between the second membrane 19 and the capillary medium 6 for better liquid flow. For example, the supply 2 includes a stop 20 (FIG. 4), below the inner cylinder 18, for limiting a sliding distance of the inner cylinder with respect to the outer cylinder. For example, the stop 20 is defined by a notch or flange or the like protruding from an edge or inner wall of the outlet 4.

In the example shown in FIG. 5, the interconnect cylinder 15 is shown as a separate part. For example, the interconnect cylinder 15 is arranged to seal and fluidically connect the liquid supply 2. For example, the interconnect cylinder 15 is arranged to be fitted in the outlet 4, for example within the outer cylinder 17. For example, the interconnect cylinder 15 includes the single cast, rigid cylinder 18 defined by a rigid circular cylindrical wall, arranged to be fitted in said outlet 4. For example the cylindrical wall 18 may be a part of an extruded tube, or an injection molded part. For example, dimensions of an outer surface of the inner cylinder 18 correspond to inner dimensions of the outer cylinder 17. For example, the second membrane 19 is connected near a top of the inner cylinder 18 and the interconnect membrane 7 is arranged at a distance d from the second membrane 19, closer to a bottom of the inner cylinder 18. The interconnect membrane 7 is relatively stiff to avoid unwanted pore deformation or contacting the second membrane 19 when the inlet 3 pushes against the membrane 19, for example stiffer than the capillary medium 6 and stiffer than the capillary member 9 (FIG. 1). The void 8 extends between the opposite membranes 7, 19. For example, the average effective pore size of the interconnect membrane 7 or the second membrane 19 is such that it has a capillary pressure of between approximately 15 and 25 water column. In other examples, other capillary pressures can be applied, for example depending on backpressures, volumes of liquid, flow, surface tension, viscosity, etc.

Figure 6:
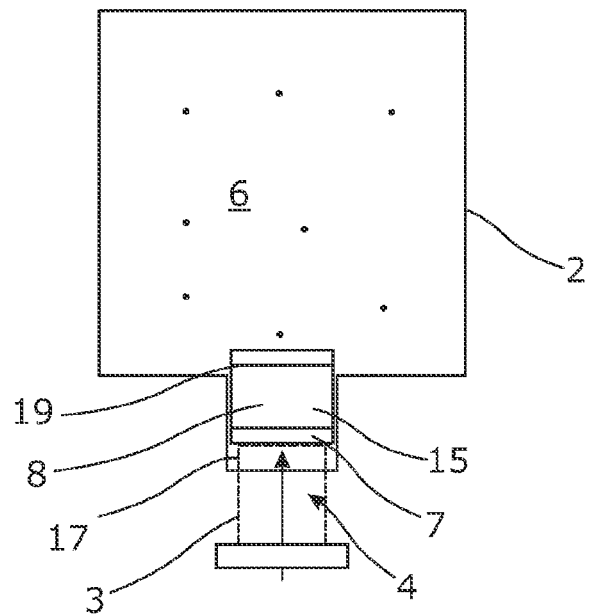
FIG. 6 illustrates a diagram of an example of a liquid supply in a first state.

FIG. 6 shows a diagram of a cross sectional side view of a liquid supply 2 in an interconnected state. The interconnect cylinder 15 is pushed inwards towards the capillary medium 6, for example by the inlet 3. For example, the inlet 3 pushes against the interconnect membrane 7. For example, the interconnect membrane 7 is stiff enough to inhibit too much deflection by said pushing force of the inlet 3, in such a way that desired pore characteristics are maintained or obtained. For example, the rigid inner cylinder 18 and the second membrane 19 are pushed against the capillary medium 6. For example a portion of the capillary medium 6 near the interconnect cylinder 15 is deformed by the inward motion of the interconnect cylinder 15. For example, also the second membrane 19 is relatively stiff. For example the second membrane 19 is stiffer than the capillary medium 6 so that when the second membrane 19 pushes against the capillary medium 6 the capillary medium locally deforms while the second membrane 19 has less deformation, or no or little deformation. For example during dispensing liquid flows through the second membrane 19, the void 8, and the interconnect membrane 7.

Figure 7:
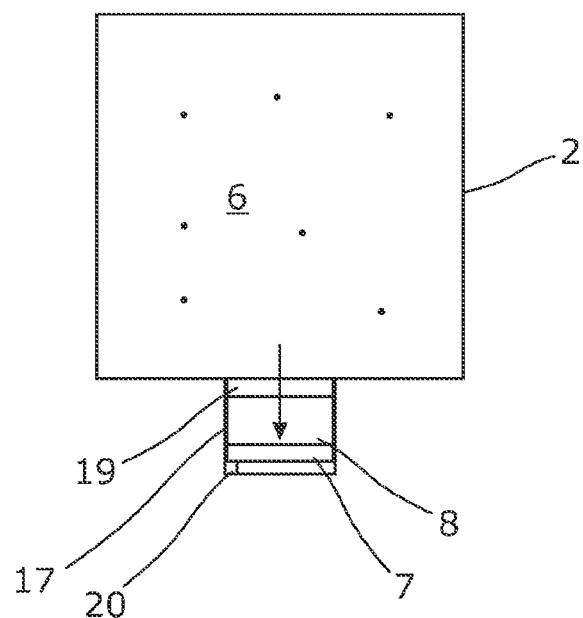
FIG. 7 illustrates a diagram of the example of the liquid supply of FIG. 6 in a second state.

FIG. 7 shows a diagram of a cross sectional side view of a liquid supply 2 in a disconnected state. For example the second membrane 19 remains in contact with the capillary medium 6. For example, at disconnection of the liquid supply 2 from the inlet 3 the liquid draws back into the capillary medium 6. For example, the stop 20 limits a sliding distance of the interconnect cylinder 15.

Figure 8:
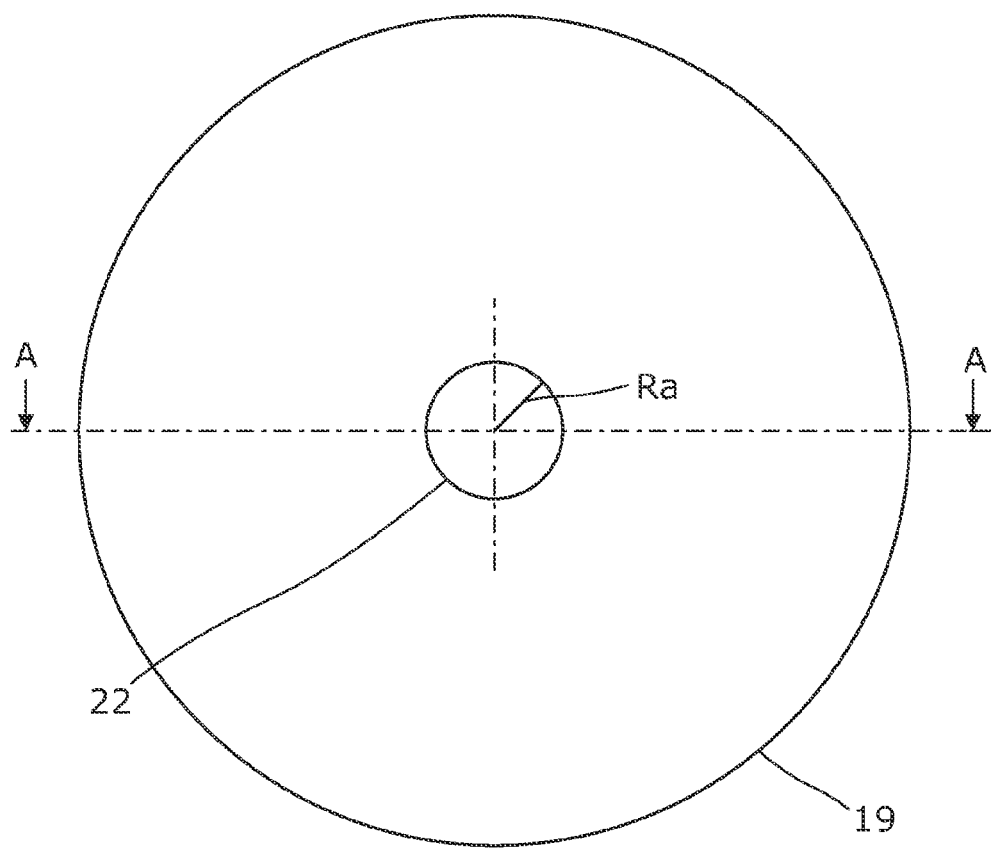
FIG. 8 illustrates a diagrammatic top view of an example of an interconnect membrane.
Figure 9:
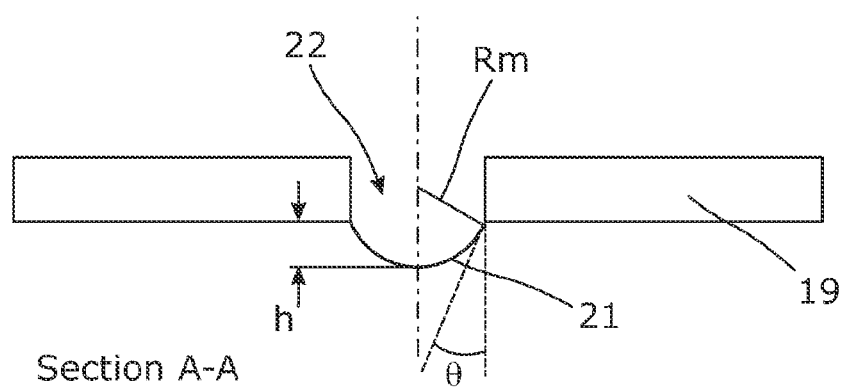
FIG. 9 illustrates a diagrammatic cross sectional side view of the example of the interconnect membrane of FIG. 8.

FIGS. 8 and 9 illustrate diagrams of an example of a second membrane 19. In one example, a minimum distance d (FIG. 1, 2) between the interconnect membrane 7 and the second membrane 19 is more than an effective maximum height h of a meniscus 21 that extends from the second membrane 19, to avoid that a meniscus 21 would contact the opposite interconnect membrane 7. The effective height h of the meniscus 21 may depend on an effective pore radius Ra. As will be understood, the illustrated pore 22 is diagrammatic of nature and in practice many pores 22 are provided. These pores 22 usually do not have a circular cross section, although it is not excluded. For example, pores 22 are defined by channels between fibers. The pore 22 has an effective radius Ra. The meniscus 21, extending from the bottom, has an effective radius Rm. In theory, these effective radii Ra, Rm may determine an effective height h of the meniscus 21 according to the following equation:

$$Rm^2 = Ra^2 + (Rm-h)^2$$

An effective height h that the meniscus 21 projects from the second membrane 19 may be stated as:

$$h = Rm - (Rm^2 - Ra^2)^{1/2}$$

This can be restated using the contact angle θ to eliminate the effective meniscus radius Rm or effective aperture radius Ra using the following equations:

$$Rm = Ra \cdot \cos\theta \text{ or } Ra = Rm/\cos\theta$$

For example, to prevent that a meniscus 21 contacts the opposite interconnect membrane 7, the distance d is more than the maximum height h of a meniscus 21, for example corresponding to a maximum effective aperture radius Ra. For example, the distance d is equal to said maximum height h and a certain margin for deflection of the interconnect membrane 7. For example such margin is at least 0.3 millimeters. In other examples of this disclosure, no second membrane 19 is provided, and the meniscus 21 may extend from a bottom of the capillary medium 6, and similar principles apply.

Figure 10:
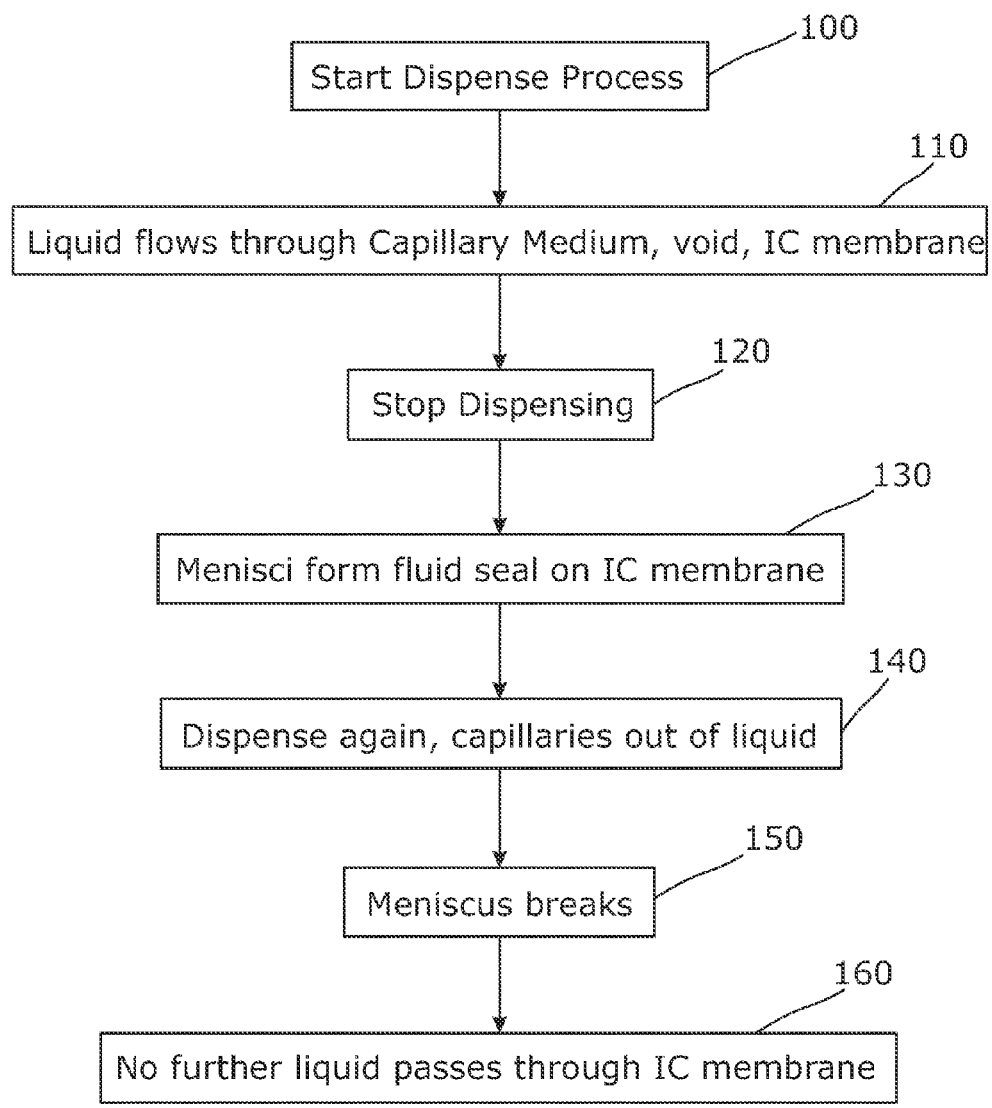
FIG. 10 illustrates an example of a method of dispensing liquid out of a liquid supply.

FIG. 10 illustrates an example of a method of dispensing liquid out of a liquid supply 2. For example, the method includes starting a liquid dispensing process (100), for example using the liquid dispense head 11. The example method includes liquid flowing out of the capillary medium 6, through the void 8, and through the interconnect membrane 7 (block 110), for example through the inlet 3 to the liquid dispense head 11. For example, the method includes stopping the dispensing of the liquid (block 120). For example, the method includes forming menisci on the interconnect membrane 7, the menisci forming a substantially fluid tight seal 7 (block 130) inhibiting air flow into the supply 2. For example, the meniscus on the interconnect membrane 7 prevents air entering the supply 2 during priming or printing actions. For example, the method includes dispensing again (block 140) while the supply 2 reaches a near empty stage. For example, at the near empty stage certain capillaries of the capillary medium 6 near the void 8 are unable to provide further liquid to the void 8 (block 140), for example because of lack of liquid or because the capillary pressure is too high because the capillary has little to no liquid. At least one meniscus on the membrane 7 or 19 breaks due to said backpressure exceeding said threshold (block 150). For example, this breaks the capillary link between the capillary medium 6 and the capillary member 9. For example, this allows air to pass into the interconnect membrane 7 and no further liquid is drawn through the interconnect membrane 7 (block 160). For example, any remaining liquid in the void 8 is drawn back into the capillary medium 6. For example, this creates a relatively straight cut off effect of the end of life of a liquid supply 2.

In an example, as capillary media 6 becomes substantially depleted during liquid dispensing, a proportion of the individual capillaries that interface with the second membrane 19 can no longer provide for liquid flow to that membrane 19. For example, this reduces the effective cross section of the liquid flow path from the capillary media 6 through that membrane 19 into void 8, therefore incurring a pressure drop across the second membrane 19. For example, once the pressure drop across the second membrane 19 exceeds the bubble pressure of either one of the interconnect membrane 7 or second membrane 7, 19, an air path opens through the particular membrane 7, 19 and air will pass through the membrane 7, 19.

For example, a multitude of individual capillaries interface with the second membrane 19 and their cross section can be summed to give the effective cross section of the flow path at that interface. When an individual capillary drains, air will reach the end of the capillary that interfaces with the membrane 19 but the meniscus 21 will resist its flow through the membrane 19 provided the pressure drop across the interface is less than the bubble pressure of the membrane 19. When this happens, the cross section of that capillary is removed from the effective cross section of the flow path. With the bubble pressure of the membrane 19 continuing to resist air passing through it, for example assuming half of the capillaries interfacing with the top membrane have drained while flow remains constant due to constant size drops continuing to be ejected from the dispense head 11 at the same rate, the pressure drop across the second membrane 19 doubles. For example, as the effective cross section continues to decrease, eventually the meniscus 21 breaks and air will fill the void 8. In an example, this can be considered a switching mechanism between single phase flow (liquid only) and dual phase flow (liquid and gas) causing evacuation of liquid from the void 8 and fluidic decoupling of the capillary media 6 from the liquid dispense head 11. In an example, such decoupling stops the supply of liquid, indicating the end-of-life of the respective supply 2.

The above description is not intended to be exhaustive or to limit this disclosure to the examples disclosed. Other variations to the disclosed examples can be understood and effected by those of ordinary skill in the art from a study of the drawings, the disclosure, and the claims. The indefinite article "a" or "an" does not exclude a plurality, while a reference to a certain number of elements does not exclude the possibility of having more or less elements. A single unit may fulfil the functions of several items recited in the disclosure, and vice versa several items may fulfil the function of one unit. Multiple alternatives, equivalents, variations and combinations may be made without departing from the scope of this disclosure.

The invention claimed is:

1. A liquid supply for connection to a liquid inlet, comprising
   a reservoir,
   a capillary medium in the reservoir,
   a liquid outlet,
   a liquid permeable interconnect membrane in the outlet, at a distance from the capillary medium, and
   a void between the interconnect membrane and the capillary medium, wherein the interconnect membrane
   is stiff enough to avoid contact with an opposite void wall in a connected state of the liquid supply, and
   has an average capillarity that is enough to maintain menisci over its surface until a substantial depletion of the capillary medium.

2. The liquid supply of claim 1 wherein an average effective pore diameter of the interconnect membrane is smaller than an average effective pore diameter of the capillary medium.

3. The liquid supply of claim 2 wherein an average effective pore diameter of the interconnect membrane is less than half of the average effective pore diameter of the capillary medium.

4. The liquid supply of claim 1 wherein the supply comprises an outer housing, and
   the outlet comprises
      a rigid outer cylinder that is part of the outer housing, and
      a rigid inner cylinder arranged within; the outer cylinder, wherein the interconnect membrane is connected to the inner cylinder.

5. The liquid supply of claim 4 wherein the inner cylinder is arranged to slide with respect to the outer cylinder.

6. The liquid supply of claim 5 comprising a stop for limiting a sliding distance of the inner cylinder with respect to the outer cylinder.

7. The liquid supply of claim 5 wherein the interconnect membrane is arranged to receive a pushing force to push the inner cylinder against the capillary medium while maintaining capillary characteristics of the interconnect membrane.

8. The liquid supply of claim 1 comprising a second membrane opposite to the interconnect membrane, defining said opposite void wall, for contacting the capillary medium.

9. The liquid supply of claim 8 wherein the liquid outlet comprises
   a rigid outer cylinder that is part of an outer housing, and
   a rigid inner cylinder arranged within the outer cylinder, wherein the interconnect membrane and the second membrane are connected to the inner cylinder.

10. The liquid supply of claim 8 wherein the second membrane, in a dry state, has an equal or similar average capillarity as the interconnect membrane, in a dry state.

11. The liquid supply of claim 1 wherein the interconnect membrane in a dry state has a capillary pressure of between approximately 15 and approximately 25 inches water column, and
    the capillary medium in a wetted state has a capillary pressure of between 1 and 1.0 inches water column.

12. An interconnect cylinder for sealing and fluidically connecting a liquid supply arranged to be fitted in a cylindrical liquid supply outlet, comprising
    a single cast, rigid cylindrical wall arranged to be fitted in said outlet,
    a liquid permeable membrane connected near a top of the cylindrical wall,
    a liquid permeable interconnect membrane arranged at a distance from the top membrane, closer to a bottom of the cylindrical wall, having a smaller effective pore diameter than the top membrane, that is stiff enough to avoid unwanted pore deformation or contact with the top membrane, and
    a void between said membranes, the liquid permeable membranes forming opposite void walls.

13. The interconnect cylinder of claim 12 wherein the interconnect membrane has a capillary pressure of between approximately 15 and approximately 25 inches water column.

14. A liquid supply comprising
    a reservoir containing a capillary medium for holding liquid, and
    an outlet, and
    an inner cylinder movable within the outlet, the inner cylinder comprising a fluid permeable interconnect membrane in the outlet having a higher capillarity than the capillary medium, arranged to contact a corresponding capillary member that has a higher capillarity than the interconnect membrane, the interconnect membrane distanced from the capillary medium forming a void between the interconnect membrane and the capillary medium, the void being filled with liquid during liquid transfer, the interconnect membrane being arranged to transport liquid out of the capillary medium and void to the corresponding capillary member, and
    have a capillary pressure of between approximately 15 and 25 water column.

15. A method of dispensing liquid out of a liquid supply, comprising dispensing a liquid,
    within the supply, liquid flowing out of the capillary medium, through a void, through an interconnect membrane in an outlet of the supply,
    stopping the dispensing of the liquid,
    menisci forming a substantially fluid tight seal over the interconnect membrane,
    dispensing again, until certain capillaries of the capillary medium near the void are unable to provide further liquid to the void,
    at least one meniscus over the interconnect membrane breaking, and
    at a dispense instruction substantially no further liquid being drawn through the interconnect membrane.

* * * * *

UNITED STATES PATENT AND TRADEMARK OFFICE
CERTIFICATE OF CORRECTION

PATENT NO. : 9,221,597 B2  
APPLICATION NO. : 14/394144  
DATED : December 29, 2015  
INVENTOR(S) : Bryan Murphy et al.

Page 1 of 1

It is certified that error appears in the above-identified patent and that said Letters Patent is hereby corrected as shown below:

On the Title page, in item (75), Inventors, in column 1, line 2, delete "Ceilbridge" and insert -- Celbridge --, therefor.

On the Title page, in item (75), Inventors, in column 1, line 4, delete "Cionee" and insert -- Clonee --, therefor.

In the Claims

In column 7, line 45, in Claim 4, delete "within;" and insert -- within --, therefor.

In column 8, line 9 approx., in Claim 11, delete "1.0" and insert -- 10 --, therefor.

Signed and Sealed this  
Nineteenth Day of July, 2016

Michelle K. Lee  
*Director of the United States Patent and Trademark Office*